(12) United States Patent
Luschi et al.

(10) Patent No.: US 9,051,161 B2
(45) Date of Patent: Jun. 9, 2015

(54) TRANSPALLET

(75) Inventors: Alessio Luschi, Florence (IT); Giorgio De Castro, Siena (IT)

(73) Assignee: PR INDUSTRIAL S. R. L., Siena (IT)

( * ) Notice: Subject to any disclaimer, the term of this patent is extended or adjusted under 35 U.S.C. 154(b) by 214 days.

(21) Appl. No.: 13/579,554

(22) PCT Filed: Feb. 16, 2011

(86) PCT No.: PCT/IB2011/050644
§ 371 (c)(1),
(2), (4) Date: Aug. 16, 2012

(87) PCT Pub. No.: WO2011/104656
PCT Pub. Date: Sep. 1, 2011

(65) Prior Publication Data
US 2012/0305867 A1  Dec. 6, 2012

(30) Foreign Application Priority Data

Feb. 17, 2010  (IT) .................................. TO10A0117
Jan. 19, 2011  (IT) .................................. TO11A0032
Jan. 19, 2011  (IT) .................................. TO11A0033
Jan. 19, 2011  (IT) .................................. TO11A0034

(51) Int. Cl.
*B66F 9/00* (2006.01)
*B66F 3/24* (2006.01)
*B60P 1/48* (2006.01)
*B62D 21/14* (2006.01)
*B62D 61/12* (2006.01)
*B62B 9/00* (2006.01)
*B66F 3/42* (2006.01)
*B62B 3/06* (2006.01)
*B62B 5/06* (2006.01)
*H02G 1/08* (2006.01)

(52) U.S. Cl.
CPC ................. *B66F 3/42* (2013.01); *B62B 3/0618* (2013.01); *B62B 3/0625* (2013.01); *B62B 5/063* (2013.01); *B62B 2501/04* (2013.01); *B62B 2501/065* (2013.01)

(58) Field of Classification Search
USPC ....................................................... 254/10 C
See application file for complete search history.

(56) References Cited

U.S. PATENT DOCUMENTS 3,026,089 A * 3/1962 Meister ...................... 280/43.12
3,136,128 A * 6/1964 Suter ............................. 60/481
3,286,985 A * 11/1966 Edera ........................... 254/2 B
3,327,996 A * 6/1967 Morse ........................... 254/2 R
3,421,775 A * 1/1969 Dugelay ..................... 280/43.12

(Continued)

FOREIGN PATENT DOCUMENTS

DE    102004013916 A1    10/2005
DE    102004030113 A1    1/2006

(Continued)

*Primary Examiner* — Lee D Wilson
*Assistant Examiner* — Alvin Grant
(74) *Attorney, Agent, or Firm* — Kilpatrick Townsend & Stockton, LLP

(57) ABSTRACT

A description is given of a transpallet for handling goods stored on a support platform, at ground level, comprising a load supporting frame fitted with a pair of front arms for gripping and lifting the platform, a hydraulic or pneumatic unit for lifting the frame and a tiller arm for maneuvering the truck directionally and lifting or lowering the frame,
characterized by the fact a least the support frame is made of composite polymeric material.

14 Claims, 10 Drawing Sheets

(56) References Cited

U.S. PATENT DOCUMENTS

| | | | | |
|---|---|---|---|---|
| 3,455,211 A | * | 7/1969 | Dugelay | 60/481 |
| 3,549,161 A | * | 12/1970 | Pusztay et al. | 280/3 |
| 3,576,333 A | * | 4/1971 | Danielson et al. | 280/659 |
| 3,843,147 A | * | 10/1974 | Fredricson | 280/43.12 |
| 3,854,748 A | * | 12/1974 | Goodacre | 280/43.12 |
| 4,223,901 A | * | 9/1980 | Klemick | 280/43.12 |
| 4,331,324 A | | 5/1982 | Andary | |
| 5,405,236 A | * | 4/1995 | Sundstrom et al. | 414/495 |
| D386,876 S | * | 11/1997 | Niebuhr | D34/34 |
| 5,975,826 A | | 11/1999 | Scholder | |
| D419,741 S | * | 1/2000 | Johansson | D34/28 |
| 6,125,971 A | * | 10/2000 | Niebuhr et al. | 187/231 |
| D447,612 S | * | 9/2001 | Niebuhr | D34/34 |
| 7,096,992 B2 | * | 8/2006 | Rogg et al. | 180/332 |
| 7,114,906 B1 | * | 10/2006 | Baumgarner et al. | 414/495 |
| 7,296,806 B2 | * | 11/2007 | Borrmann | 280/43.12 |
| 7,641,011 B2 | * | 1/2010 | Fridlington et al. | 180/68.5 |
| 7,712,582 B2 | * | 5/2010 | Burton et al. | 187/238 |
| 7,976,032 B1 | * | 7/2011 | Dockins et al. | 280/43.12 |
| 8,360,443 B2 | * | 1/2013 | Ellington | 280/43.12 |
| 2002/0109317 A1 | * | 8/2002 | Lee | 280/43.12 |
| 2005/0045860 A1 | * | 3/2005 | Seidlhuber | 254/93 VA |
| 2005/0116432 A1 | * | 6/2005 | Borrmann | 280/43.12 |
| 2006/0181039 A1 | * | 8/2006 | Fridlington et al. | 280/43.12 |
| 2010/0096606 A1 | * | 4/2010 | Lee | 254/10 |
| 2010/0295261 A1 | * | 11/2010 | Ellington | 280/43.12 |
| 2012/0139209 A1 | * | 6/2012 | Weiss | 280/482 |
| 2013/0223962 A1 | * | 8/2013 | Ellington et al. | 414/495 |

FOREIGN PATENT DOCUMENTS

| | | |
|---|---|---|
| DE | 10310669 B4 * | 2/2007 |
| DE | 102009038652 A1 * | 2/2011 |
| EP | 2284061 A1 * | 2/2011 |

* cited by examiner

TRANSPALLET

CROSS REFERENCES TO RELATED APPLICATIONS

The present application is a U.S. National Phase Application under 35 U.S.C. §371 of International Application No. PCT/IB2011/050644, filed on Feb. 16, 2011, which claims the benefit of Italian Application Nos. TO2010A000117, filed Feb. 17, 2010; TO2011A000032, filed Jan. 19, 2011; TO2011A000033. filed Jan. 19, 2011; and TO201 1A000034, filed Jan. 19, 2011, which are expressly incorporated herein by reference in their entirety for all purposes.

This invention regards the manual lift trucks commonly known as transpallets, and more specifically a transpallet in accordance with the preamble in Claim 1.

These trucks are widely used not only in industry but also in commerce, for handling including gripping and placing on the ground of goods stored on a support platform or pallet, generally made of wood, the top of which for supporting the goods is raised by means of supports which define corresponding slots for inserting lifting means.

A traditional transpallet comprises a frame having a pair of parallel arms or forks at the front for gripping and lifting, adapted to be inserted in the slots made in the base of a platform. Raising the frame, with a limited stroke that is sufficient to lift the platform from the ground, takes place by means of a hydraulic or pneumatic actuating unit. The frame is fitted on a pair of swivelling wheels and the arms are supported at the ends by a respective pair of load rollers so that the truck can be translated by pushing or pulling by an operator who uses a tiller arm for the directional movements and lifting and lowering commands.

More specifically, the lifting means, traditionally a hydraulic unit, make it possible to raise the frame a few centimeters from the ground or support level by operating a jack or pumping hydraulic cylinder which, by means of the action of an operator on the tiller arm, draws in a motor fluid under pressure (generally oil) from a tank and drives it into a main hydraulic chamber where it stresses a rod that commands the forks to lift. By means of a thrust mechanism, a pair of struts housed longitudinally inside each fork, stressed by a rocking member driven by the action of the hydraulic unit, cause the forks to lift by acting on respective articulating supports (blocks) that bear the load rollers.

A three-position lever on the tiller arm makes it possible to select not only the pumping procedure for lifting the frame and the detachment of the platform from the ground, but also an idle position, so that when the tiller arm is actuated the forks are not lifted and it is possible to freely govern the translation of the load in the premises in which they are to be moved, and a frame descent position for resting the transported load on the ground.

Lift trucks are traditionally made of metallic material, from steel section conveniently bent and welded and/or from cast iron castings, in order to permit the lifting of heavy loads, up to a limit that normally reaches around 2500 kg. This obviously entails a considerable unloaded truck weight, in the order of 60-70 kg, and this makes it difficult to handle, both when carrying out traditional pushing or pulling manoeuvres on flat surfaces, or when overcoming obstacles with height differences when moving the truck, and even during operations for loading and unloading trucks from vans used for transporting them, when these are not fitted with a mobile platform between the loading bed and ground level.

Thus, an increasing demand can be noted for manageability and the reduction of the manoeuvring effort required from the operator.

At the same time, it is recognised that classic transpallets are deemed to be over-dimensioned in terms of capacity, given that the overwhelming majority of the goods stored on platforms of the pallet type rarely exceed a total weight of 1000 kg.

A further problem with traditional metallic trucks is that, in order to protect them from corrosion phenomena that depend on the place of use, they must be subjected to painting, an operation which at the same time makes it possible to mark the truck in the colour that identifies its manufacturer or provenance. However, the film of paint applied on the metal structure tends to deteriorate with use and expose the truck to the aforementioned corrosion risks and also give rise to an unattractive aesthetic impact.

This invention therefore has the object of creating a transpallet with an improved structure, adapted to guarantee greater manageability of the truck during its use and transportation, along with increased protection from corrosion agents.

According to this invention, these objects are reached thanks to a transpallet with the characteristics defined in Claim 1.

A further object of this invention is a method for fabricating a transpallet as claimed.

Particular embodiments are the subject of dependent claims, the content of which is to be intended as an integral or integrating part of this description.

In short, this invention is based on the principle of making a transpallet structure with parts made of polymeric material, while maintaining the functionality of a classic manual transpallet. More specifically, at least one and preferably all the truck's component parts of greater volume or weight, namely the frame, the hydraulic or pneumatic lifting unit and the tiller arm, are made of technopolymer, for example a polypropylene or polyamide matrix charged with fibreglass, using known injection moulding techniques. In the preferred embodiment, the project envisages the manufacture of all the components of greater volume in polymeric material, while maintaining the use of metallic materials for those smaller-scale components that are subject to high stresses, such as struts and ties, or to precision movements, such as the pumping piston of the hydraulic unit, and finally for the structure's retention elements such as pins and bolting components.

The mechanical properties conferred on the structure by the polymeric material are lower than those conferred by the metal materials, but this is compensated by a reduction of the nominal capacity of the truck, in the worst case from 2500 kg to 1000 kg, therefore still guaranteeing the possibility of using the truck itself in most practical applications.

Advantageously, the truck made of composite polymeric material of the invention is extremely light, the unloaded weight being reduced from the current 65 kg to about 15-20 kg, so that it is more manageable and is easy to manoeuvre and transport, for example when it is being lifted during operations for loading/unloading it from lorries or vans.

The truck also has bulk colouring of the polymeric material parts, thereby preventing the problems of paint loss and exposure of the metal parts to corrosive agents, typical problems in known trucks. This also contributes to improving the aesthetic appearance of the truck, which will maintain its colouring even in the parts subject to scratching.

The reduced number of exposed metal parts renders the truck particularly compatible with use in the foodstuffs industry as corrosion problems on the metal parts due to moist or salty environments are drastically reduced or totally eliminated.

A further advantage comes from the greater quietness of the truck compared with trucks bearing metal parts in contact with or rubbing against each other that would require costly solutions such as the provision of bushings, and the fitting of bumpers and of vibration-proofing devices, in order to reduce the noises generated by use by an analogous extent.

Finally, the materials used and the machining techniques employed entail a substantial reduction in the costs of the machine.

Further characteristics and advantages of the invention will be set out more exhaustively in the following detailed description of an embodiment, provided for exemplificative and not limitative purposes, with reference to the attached drawings, in which:

FIG. 8b is a section view of a jack or hydraulic pumping cylinder of the actuating system in FIG. 8a;

FIG. 8c is a section view of the valve unit of the actuating system of the hydraulic unit in FIG. 8a;

Figure 1:
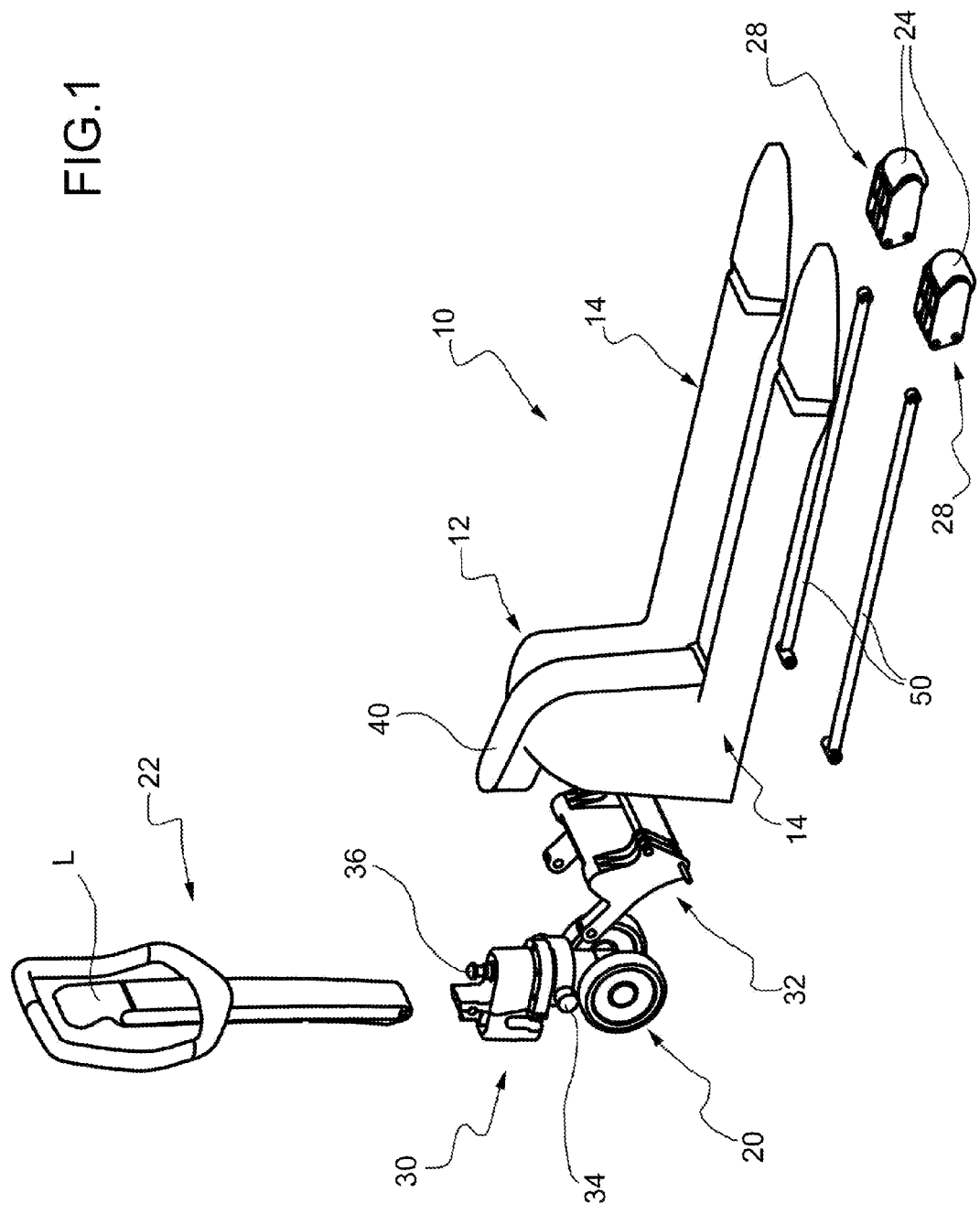
FIG. 1 is an exploded view of a manual lift truck according to the invention, in which the main component parts are highlighted.

The structure and the operation of a lift truck (hereinafter transpallet, for brevity) with components made of technopolymer according to the invention are analogous to that of a traditional transpallet and are recalled briefly below with reference to FIG. 1.

A frame for supporting a platform (pallet) for the provisional storage of goods is generally indicated 10. It comprises a base bearing structure 12, with a limited vertical extension, and is fitted with a pair of parallel front arms or forks adapted to be inserted into the base of the platform in order to lift it.

The frame is supported, in correspondence with the base bearing structure 12, by a wheel or a pair of adjacent wheels 20 that swivel around a vertical axis, adapted to enable the truck to be steered by means of a tiller arm 22.

On the other side, the free end of the arms 14 is supported by a pair of load rollers 24, fitted on articulating supports 28, which permit their displacement depending on whether the frame is being lifted or lowered with respect to the ground.

A hydraulic unit 30, in axis with the wheels 20, is connected to the frame by means of a rocking member 32 hinged to the diametrically opposite ends of a cross-like support 34 and makes it possible to lift/lower the frame by means of a lifting rod 36 the head of which is engaged in a seat 38 obtained in an abutment formation 40 of the frame, and the movement of which is determined by a control fluid (generally oil) under pressure driven by a jack or single-acting pumping cylinder 42 which, controlled by the tiller arm 22 by means of a control member 43, actuates the intake of the fluid from a tank 44 and pushes it into a main pressure chamber of a sliding cylinder 46. By means of the rocking member 32, which follows the lifting of the frame, a pair of struts 50, hinged with the rocking member and pushed by it, raise the arms by acting on the articulating supports 28 which bear the load rollers 24.

A three-position actuating lever L on the tiller arm 22 makes it possible to select not only the pumping modality for lifting the frame, but also a suitable idle position for translating the load, and a frame descent position.

The specific innovation of the product can be found in the choice of the material and in the technology for producing the individual parts.

Indeed, at least one and preferably all the functional and structural parts listed, namely the frame 10, the rocking member 32, the articulating supports 28, the cross-like support 34, the tiller arm 22, the wheels 20 and the load rollers 24, and the hydraulic unit 30, are made by the injection moulding of a composite polymeric material (technopolymer) obtained from a polypropylene or polyamide matrix charged with glass fibre.

Preferably at least the component parts of the truck with the greatest volume or weight are made of technopolymer.

Each of the parts mentioned above, with the exception of the hydraulic unit, consists of a single monolithic block that can be moulded by injecting plastic material in a single operation. For functional reasons the hydraulic unit, on the other hand, is made up of several parts that require assembly after their manufacture.

The transpallet according to the invention includes some metal components (e.g. steel), such as the jack or pumping cylinder 42, the lifting rod 36, the struts 50, the actuating fluid control valves and all the retention elements of the component parts of the complex such as the bolting elements, pins and springs.

The abovementioned parts can conveniently be made of stainless steel in order to prevent corrosion risks caused by humid or salty atmospheres, just as is the case for the components in polymeric material.

The main parts of the transpallet that is the subject of the invention are described below with reference to the figures.

The Frame-Lifting Mechanism Assembly

Figure 2A:
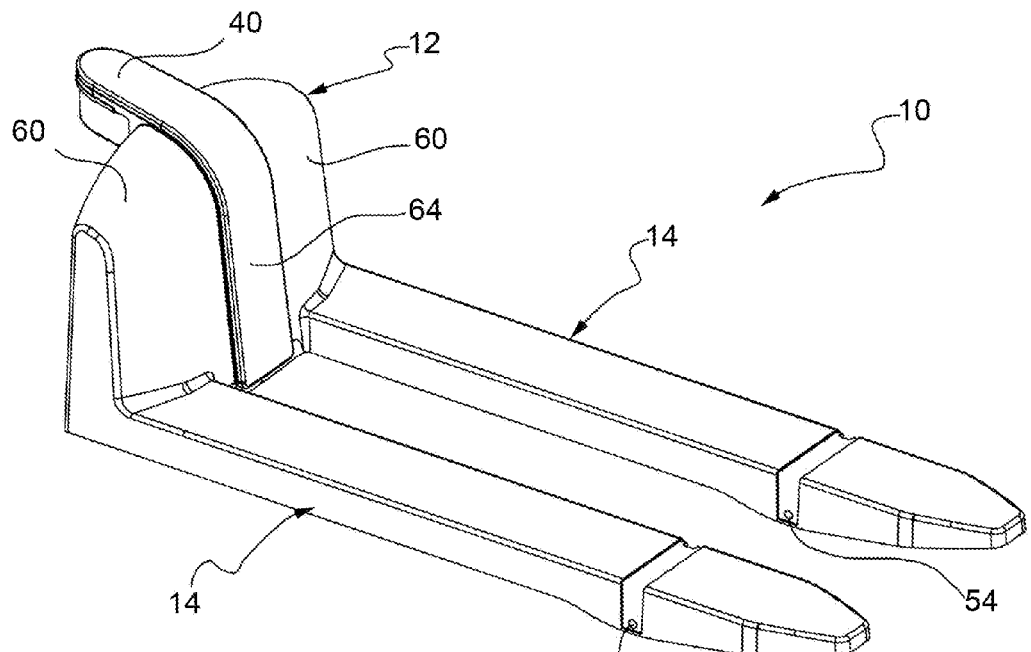
FIGS. 2a and 2b are respectively a perspective view from above and an elevation view from below of the frame structure of the truck in FIG. 1.
Figure 2B:
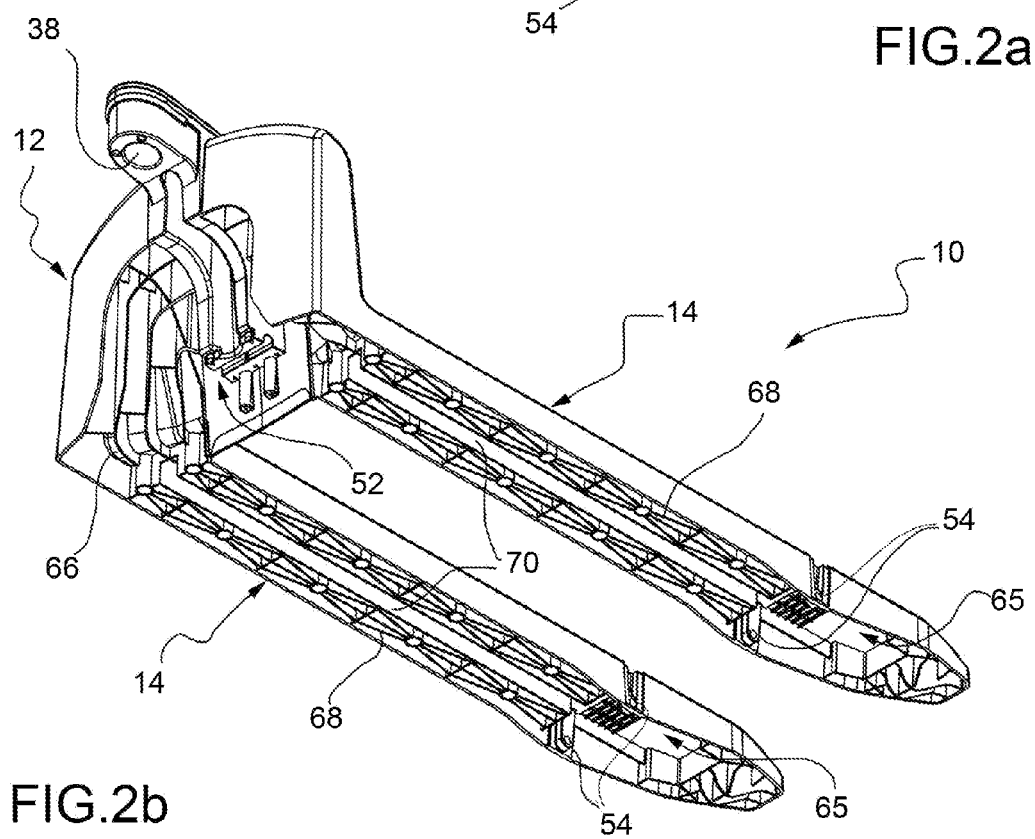

The frame 10 is shown in detail in FIGS. 2a and 2b.

The frame 10 is made as a monolithic structure that comprises the base load-bearing structure 12 and the two lifting arms 14 connected to it. The connection points with the other machine components that permit the lifting movement, respectively the seat 38 for the head of the lifting rod, a seat 52 for a connection pin with the rocking member and seats 54 for the connection pins with the articulating supports 28 of the load rollers, are defined on the base structure.

The top surface of the frame, exposed to both the horizontal and vertical support of the load, is shaped in such a way as to present broad and substantially flat support areas. The base load-bearing structure 12 has two lateral setback shoulders 60, at the feet of which the lifting arms 14 are connected in correspondence with high-radius connecting sections adapted to favour the moulding and the structural strength of the block, without interfering with any platform loaded on the forks.

There is a central region 64 in a more advanced position between the lateral shoulders 60 of the frame base, intended for supporting the load.

At the distal end of the lifting arms, the load rollers are arranged in seats 65 defined under the lifting arms 14 on the side facing opposite to the load support surface from the other side, in such a way that the arms have a load support plane that is uniform overall, advantageously without apertures or grooves that would constitute channels for the passage of contaminant or corrosive agents between the load housing volume and the ground, particularly when using the truck in aggressive environments or for the transportation of goods in the foodstuffs sector.

The overall volume of the frame is generally hollow in order to lighten the structure as a whole, and is open at the bottom where it has reinforcing ribs 66, 68 adapted to confer a satisfactory structural strength, the arrangement of which is selected in such a way as to connect the most stressed areas to each other, i.e. the areas in correspondence with the couplings 54 of the load roller articulating supports, with the lifting arm connections subject to bending, with the couplings 52 of the rocking member, and with the seat 38 of engagement of the lifting rod belonging to the hydraulic unit.

In particular, the support ribs 66 behind the base structure are arranged in concentric arches in order to connect the arms structurally to the central region, and the reinforcing ribs 68 of the arms follow a general cross-like arrangement, repeated on the adjacent cells, in correspondence with the lateral region of the arms. A free channel 70 is defined centrally on each arm, along the associated longitudinal axis, and acts as the seat for the struts 50 that connect the rocking member 32 to the articulating supports 28 of the loading rollers.

In the preferred embodiment, the structure has been made with a wall thickness of about 4 mm, in such a way as to respect a capacity specification of at least 1000 kg.

The conformation of the ribs, the solid volumes and the hollow spaces are designed in such a way as to be able to be formed in a single injection moulding operation, and to easily extract the mould.

Advantageously, the monolithic realization of the structure makes it possible to obtain greater resistance to load deformations in the connecting sections between the base load-bearing structure 12 and the arms 14 of the frame. Furthermore, the injection moulding production process is simplified compared with the traditional production process for steel transpallets, as it takes place in a single operation, thereby eliminating the subsequent sheet forming, bending, welding and painting operations.

Even more advantageously, the working of the technopolymer makes it possible to obtain new forms without additional charges, provided that the constraint of extractability of the mould is respected, and in particular the definition of connecting curves between the arms and the base structure which better permit the distribution of the forces on the entire structure and therefore the reduction of the points or sections subject to breakage.

Figure 3:
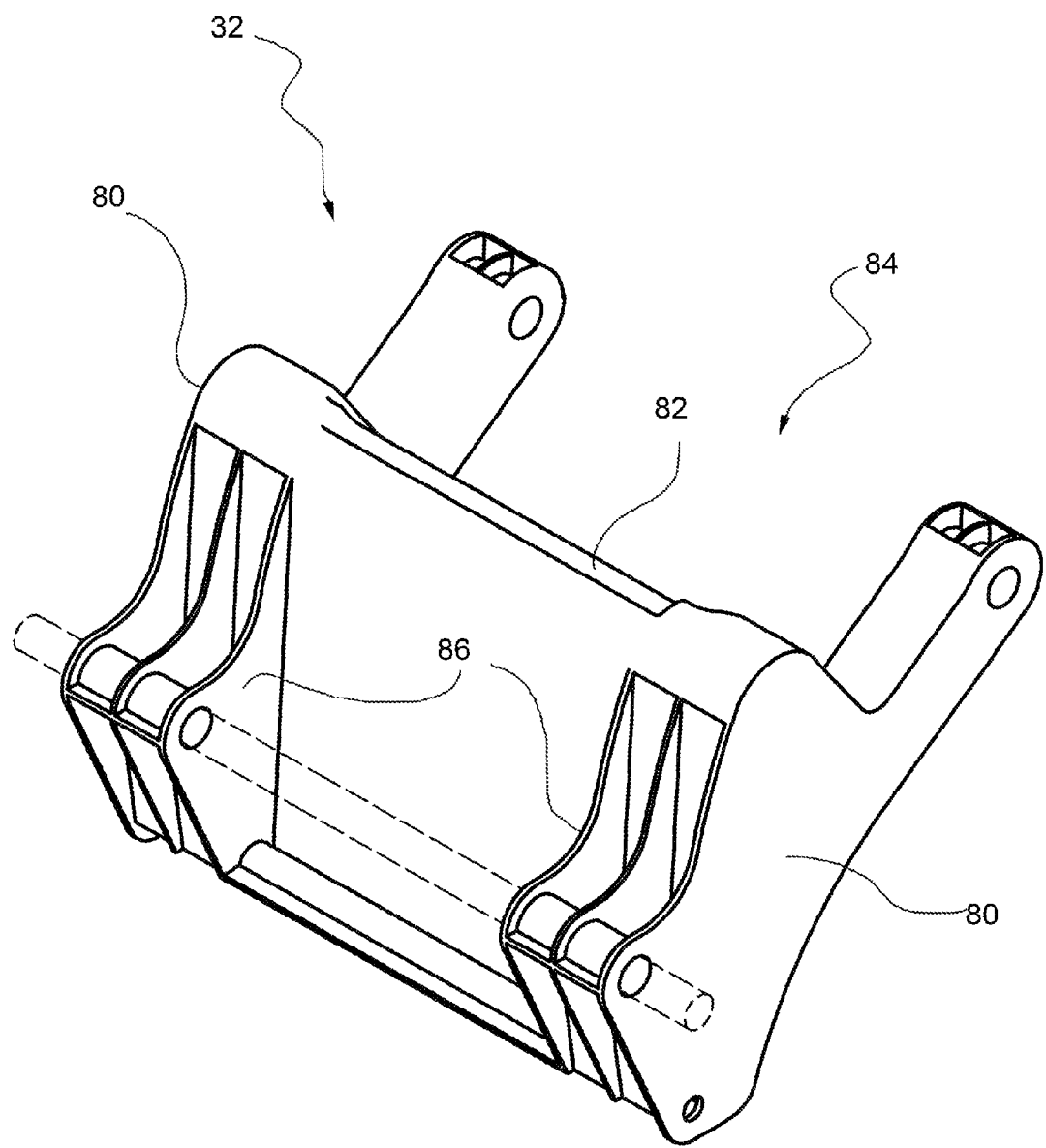
FIG. 3 is a perspective view of a rocking member of the truck in FIG. 1.

The rocking member 32, shown in FIG. 3, is also made as a monolithic structure and has a general H-like form comprising a pair of sides 80 linked together by a central bridge 82, which provides the structure with strength and simplifies its assembly.

On one side with respect to the central bridge, the member has a first fork-like seat 84 for the articulation to the cross-like support 34 and, on the other side, a pair of cantilever formations 86 for hinging to the frame and to the struts by means of a single common transverse knuckle pin (shown by the broken line), in order to facilitate assembly and improve the strength of the connection.

The structure of the rocking member is also hollow and stiffened by parallel longitudinal ribs (not shown).

Figure 4:
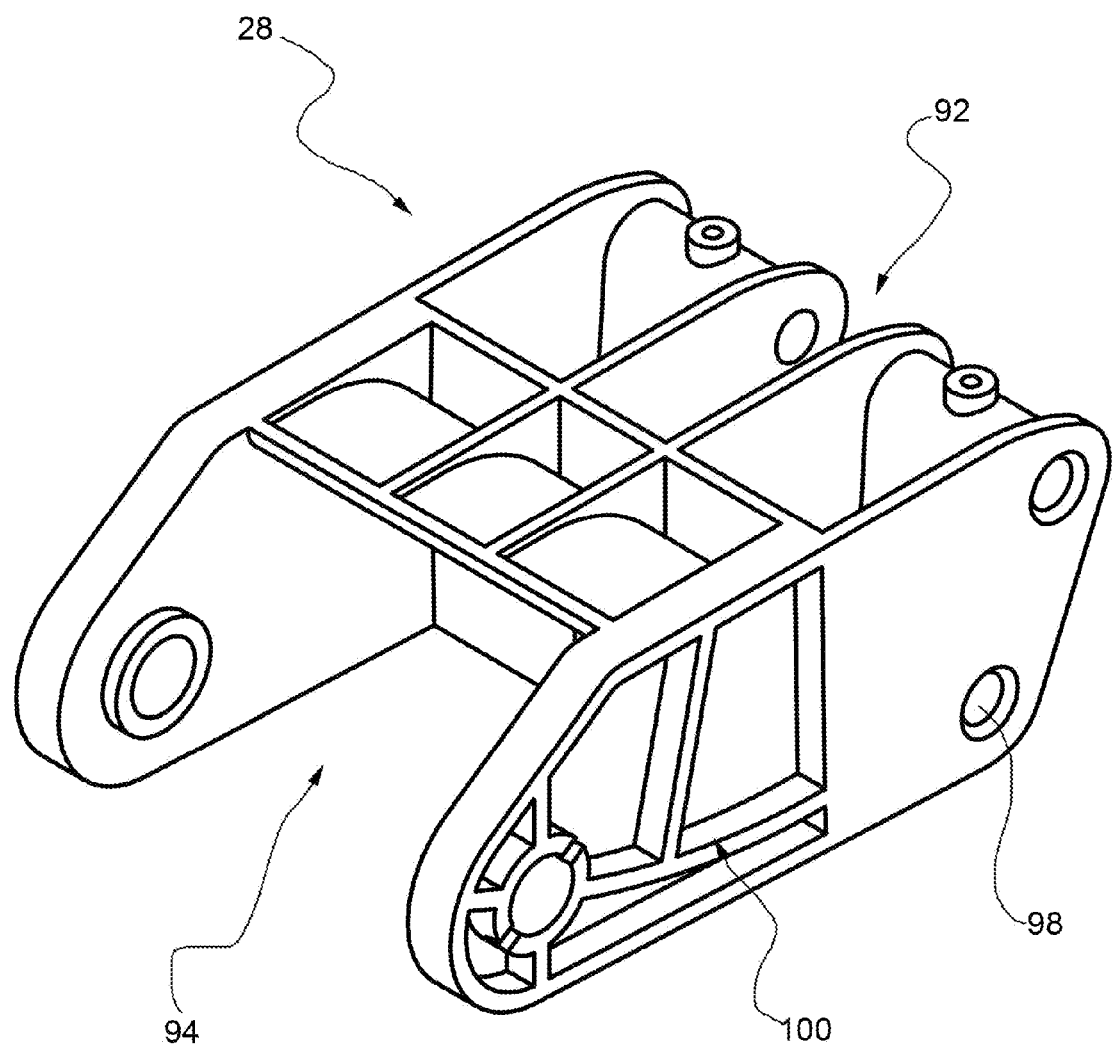
FIG. 4 is a perspective view of an articulating support of the rollers of the truck in FIG. 1.

The articulating supports 28 of the load rollers, shown in FIG. 4, also have a general H-like conformation which on one side defines a first narrow fork 92 for hinging the strut and, on the opposite side, a second broadened fork 94 for housing the respective load roller. Hinging seats 98 are defined on the sides of the component adapted to receive the hinging means 54 defined on the lifting arms 14.

The articulating support structure is also hollowed and the outer faces of the first and second fork 92, 94 have intersecting reinforcing ribs 100 for stiffening it.

More in general, the reinforcing ribs of the various components are shaped in such a way as to prevent distortions of the structure when extracting the mould.

The Tiller Arm

Figure 5:
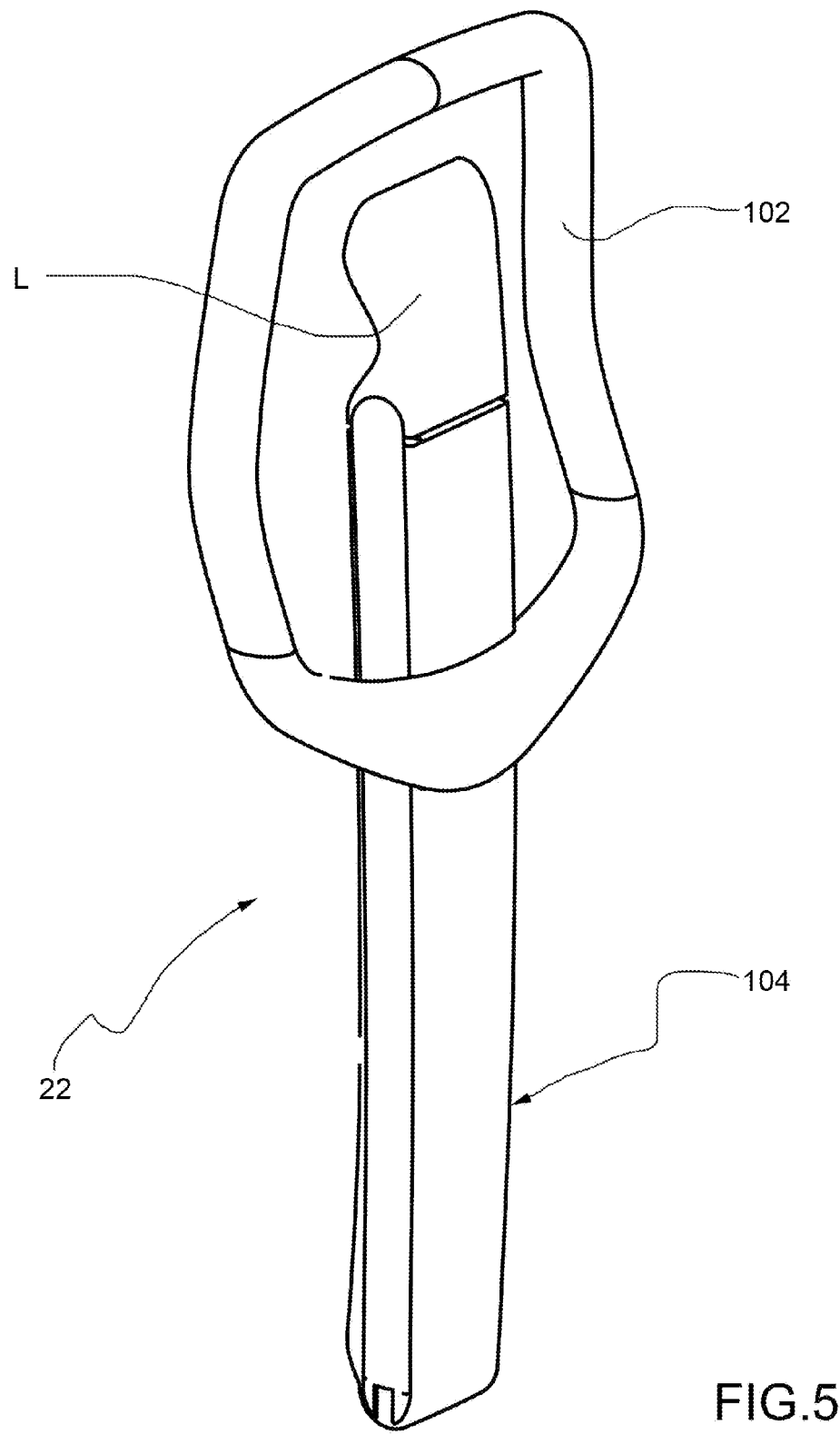
FIG. 5 is a perspective view of the tiller arm of the truck in FIG. 1.

The tiller arm 22 fitted on the hydraulic unit 30, shown in FIG. 5, has a tubular frame 102, the top section of which constitutes the handle used by the operator for steering the transpallet. A column 104 extends along the median axis of the frame at the top of which the actuating lever L is arranged.

The handle 102 and the column 104 constitute a single monolithic piece. The column is covered on the front and rear by two covers in such a way that a linking element between the actuating lever L and the control member 43 of the pumping unit can be enclosed inside it. This element is preferably made up of a belt or rope made of textile fibre (for example: polyester, polypropylene, Kevlar) instead of the classic tie of steel wire and chain, thereby preventing problems of corrosion and humidity.

The tiller arm can also be made by the injection moulding of a polymer material in a single mould, the tubular frame being obtainable by gas injection moulding.

The Hydraulic Actuating Unit

The different possibilities and problems associated with the use of polymer materials requested complete redesigning of the hydraulic actuating unit 30 that constitutes the "propulsive" part of the machine.

Figures 6A, 6B:
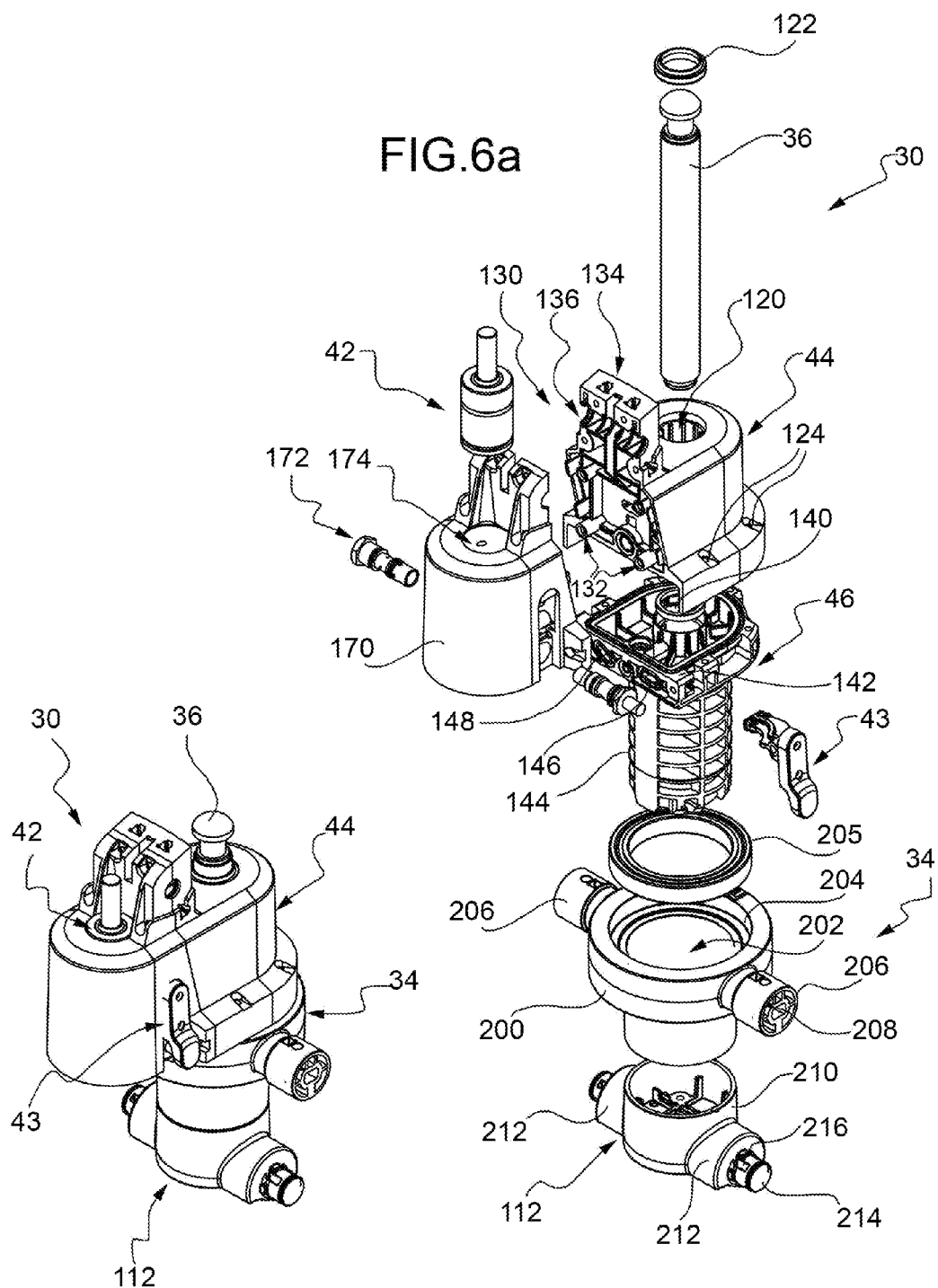
FIGS. 6a and 6b are respectively an exploded view and a view in an assembled condition of the hydraulic actuating unit of the truck in FIG. 1.

FIGS. 6a and 6b respectively show an exploded view and an overall view of the hydraulic unit in which it is possible to identify the fluid tank 44, the housing block of the pumping actuating system 42, the frame lifting rod 36 and the associated sliding cylinder 46, the cross-like support 34 for the connection with the rocking member 32 of the lifting mechanism, and a wheel axle block 112.

The fundamental concept of the new design consists of the breakdown of the hydraulic unit structure (which in classic transpallets is a monolithic cast iron block) into several parts, each of which is obtainable by injection moulding without additional mechanical operations so that the pieces will be ready for definitive assembly when they have been removed from the mould. The various parts are shaped in a corresponding way in the mating walls, in order to obtain channels for the actuating fluid for example.

Advantageously, making the unit in several different assemblable components makes it possible to make the material different in the parts, on the basis of the associated structural needs, by varying the percentage of the fibreglass charge for example.

A detailed analysis of the constituent parts of the hydraulic unit structure is given below.

Obtained in the tank 44 of the hydraulic unit, adapted to contain the fluid (generally oil) at atmospheric pressure necessary for actuating the unit, is a guide cavity 120 adapted to receive the lifting rod 36 and a seat for a scraper element 122 for hydrodynamic applications, for example an elastomeric ring of the type for press-fitting in an open slot, adapted to prevent the dragging of foreign elements (grease, dirt) into the sliding cavity 120 of the lifting rod.

A plurality of metallic retaining means 124, connection systems of the screw-and-nut type for example, is arranged to couple the tank stably on a top flange 126 of the sliding cylinder 46 and, at the same time, keep a sealing gasket (not visible) in position.

On one side the tank has a shaped vertical wall 130 provided with tubular seats 132 for the means of connections to the body housing the pumping jack 42 and comprising a raising formation 134 obtained on which is a half-channel 136 for housing a tiller arm rotation pin.

The sliding cylinder 46 of the lifting rod 36 defines a chamber 140 under pressure of the hydraulic unit as well the base 142 of the tank in correspondence with the top flange 126. The cylinder has an outer lateral surface 144 which is ribbed in the axial and circumferential direction in such a way as to guarantee resistance to an operating pressure, limited however, to 140 bar for example, by a safety valve in the unit which makes it possible to raise a 1000 kg load on the arms.

Also obtained in the block is a channel 146 for the intake of the fluid from the tank and a channel 148 for sending the fluid towards the chamber under pressure, as well as a seat for the main sealing gasket.

Figure 7:
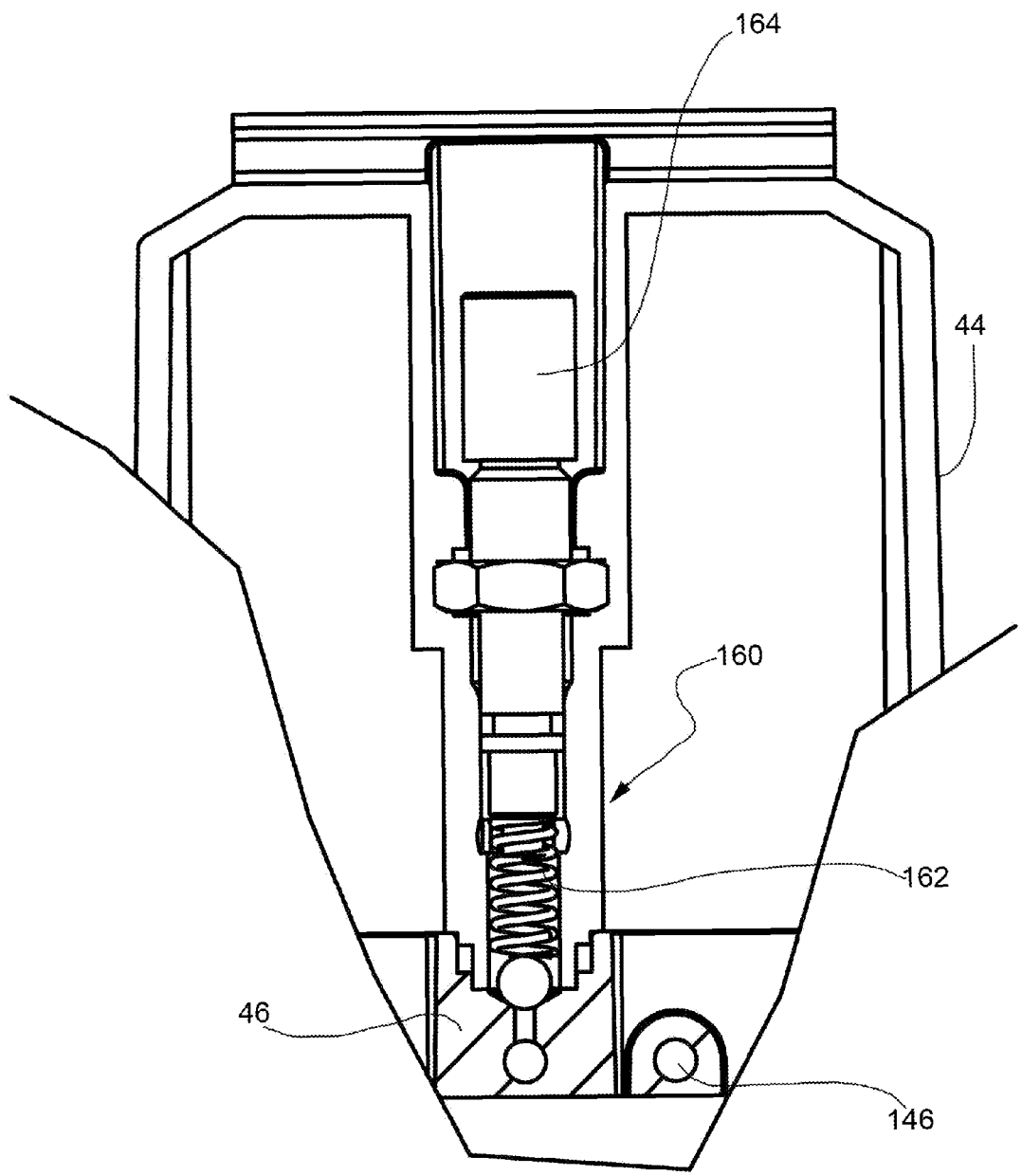
FIG. 7 is a partial section view of a safety valve of the hydraulic unit in FIG. 6.

A safety valve 160 shown in FIG. 7, arranged in the tank with its axis parallel to the lifting rod puts the chamber under pressure 140 into communication with the tank 44 when the pressure exceeds a predetermined limit value, thanks to the action of a preloaded spring 162, the preload of which can be adjusted by means of the action of a registration pin 164.

The safety valve is arranged upstream from a relief valve of the pumping unit known per se, so that the safety opening of the hydrodynamic circuit is also triggered if the overload is applied by dropping a load using external lifting means onto the transpallet arms when they are in a raised position, contrary to what happens in known transpallets in which the safety valve acts exclusively when arms previously loaded in a rest position are raised.

The tightness between the various parts (tank, cylinder and pumping system) is guaranteed by the presence of shaped O-rings in the coupling areas.

Figure 8A:
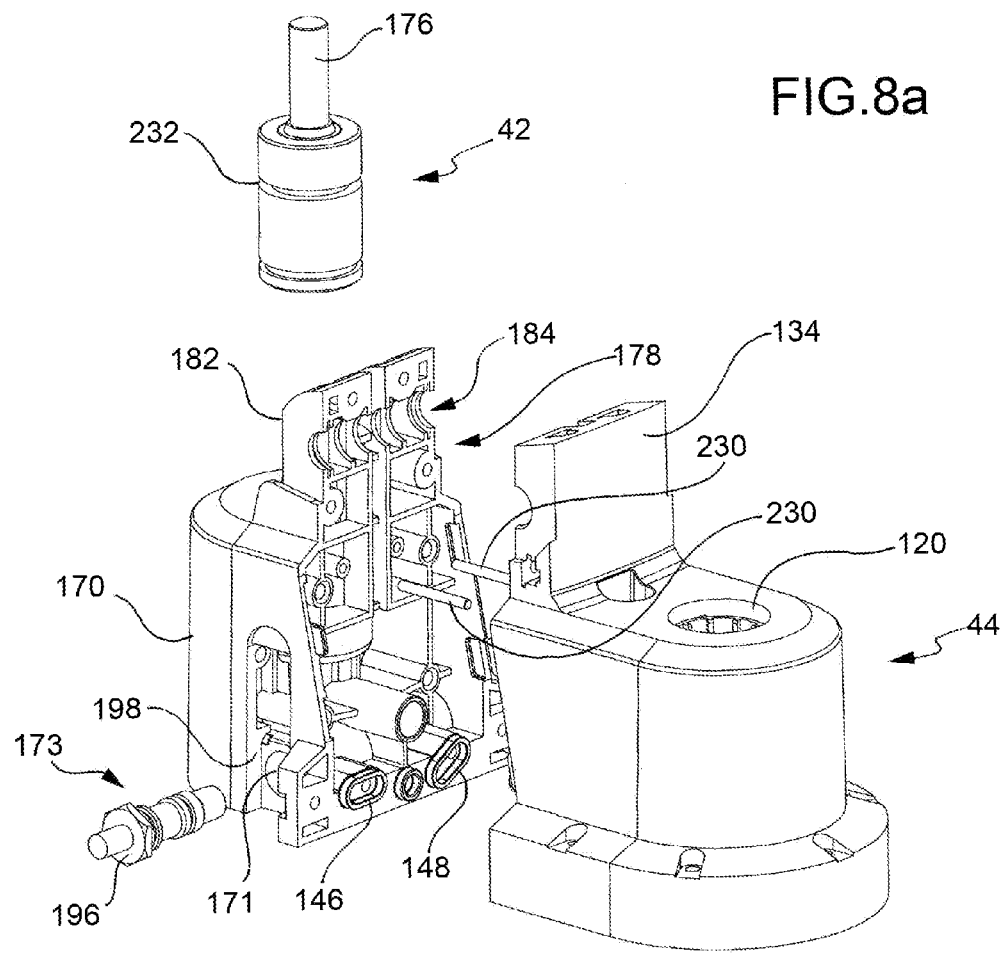
FIG. 8a is a partly exploded perspective view of the pumping actuating system and of the tank of the hydraulic unit in FIG. 6.

FIG. 8a shows the block 170 of the unit's actuating (pumping) system, obtained in which by moulding are the seat 171 of the valve assembly comprising a relief valve 172 and a hydraulic actuation control valve 173, and the seat 174 of the pumping cylinder 42, the last of these being able to slidably receive an actuating piston 176 controllable by the tiller arm.

Also obtained in the block 170 are channels corresponding to those defined on the block of the sliding cylinder 46, i.e. the delivery channel towards the relief valve (which is lengthened towards the pressure chamber 140 of the sliding cylinder block) and the intake channels towards the pumping cylinder 42 (coming from the tank 44).

On one side the block has a shaped vertical wall 178 provided with tubular seats for the means of connections to the tank 44 and comprising a raising formation 182 obtained on which is a half-channel 184 complementary to the half-channel 136 defined on the tank, for housing a tiller arm rotation pin.

The block 170 constituting the actuating system is connected to the tank 44 and to the sliding cylinder 46 by means of screws or similar metallic retention means and closes the hydraulic unit as a whole towards the outside.

The pumping cylinder 42 (shown in section view in FIG. 8b) is made of a metallic material and, on its own inner lateral surface, has sealing gaskets 190 for the pumping piston 176 sliding in it. At the bottom of the sliding cavity 192 of the piston 176 is a seat for receiving a return spring 194 acting on the piston. Unlike known transpallets, as the tiller arm is much lighter, it is possible to make use of a much smaller return spring which can be housed inside the pumping cylinder, instead of outside it where it would be exposed to the atmosphere of the environment. This characteristic makes it possible to make an actuating system in a completely closed structure, thereby improving both its strength/rigidity and its protection against external contaminant agents.

Figure 8C:
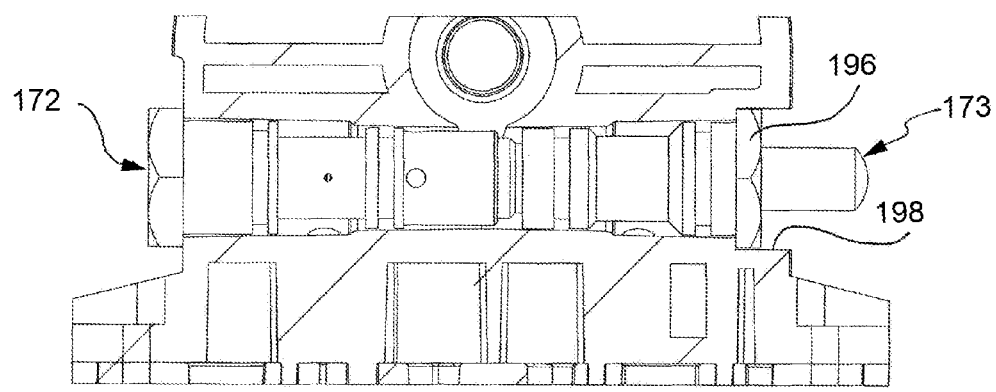
Figure 8B:
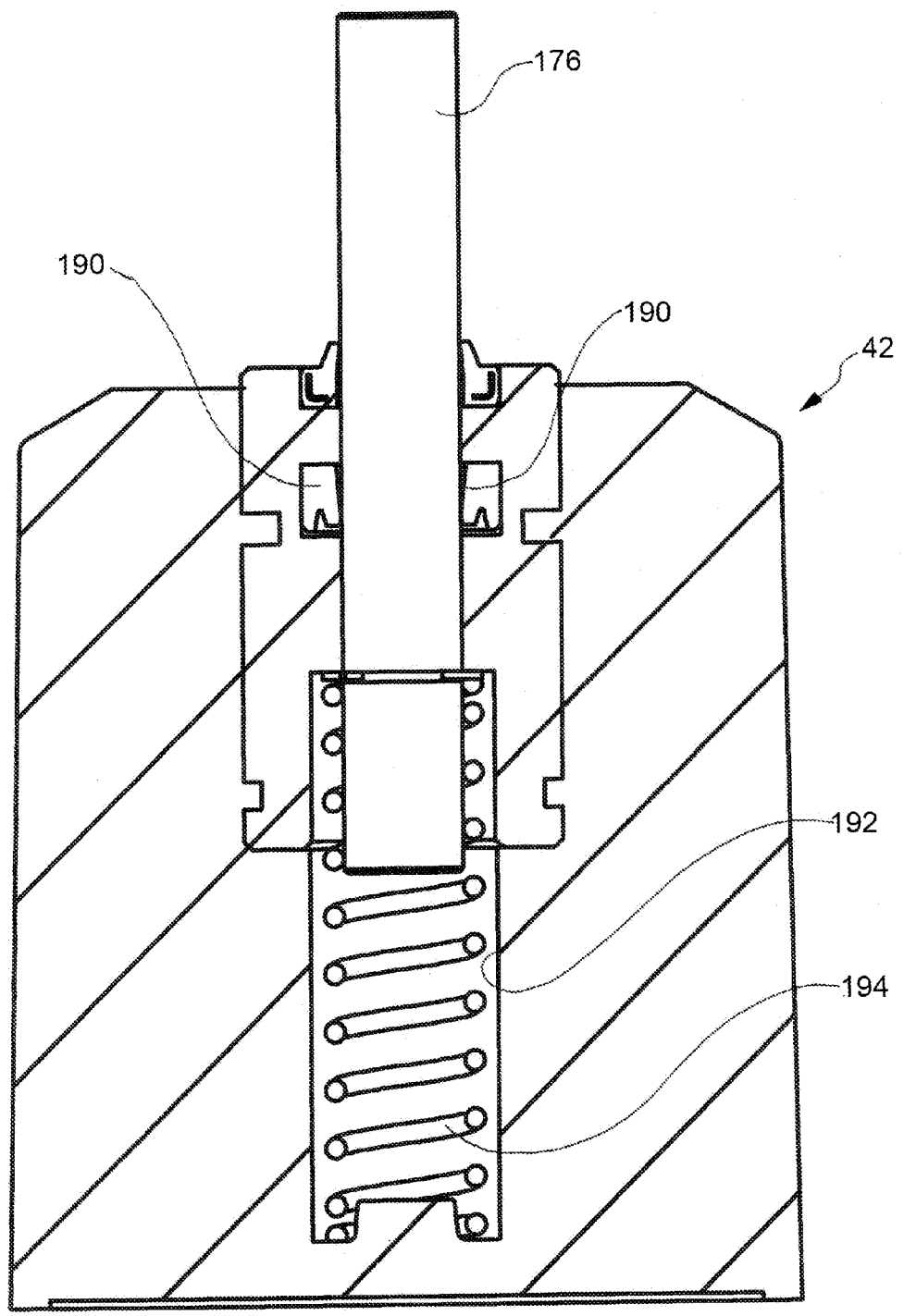

The valve assembly, shown in FIG. 8c, is fitted in the seat 171 obtained directly by moulding in the block 170 of the actuating system and is composed of steel elements that are easy to make by turning.

The control valve 173 is inserted in its seat 171 and blocked in rotation by making its hexagonal head 196 in a respective seat 198 obtained in the block 170. The relief valve 172 is inserted in its seat, screwed onto the externally threaded end of the control valve, through its internally threaded end, thereby ensuring the tightness of the valve assembly.

A conical sealing element makes it possible to obtain proportional control of the arm descent speed. The action on the actuating lever L and its rotation more or less accentuated determines the degree of axial translation of the conical element which directly governs the oil flow in a proportional way and, as a result, the arm descent speed.

The placing of a metallic sealing element on a seat that is also metallic makes it possible to prevent any problems of wear that a metallic part could provoke on a plastic part with a much lower surface hardness.

Considering the fact that the pumping system is fitted in a cantilever fashion and receives the stresses exerted by the tiller arm during pumping, the tank-pumping system is also guaranteed by means of a plurality of cylindrical steel pins which permit better distribution of the loads towards the front of the truck.

The cross-like support 34 constitutes the linking part between the hydraulic unit and the rocking member. A tubular cavity 202 is defined in the main body 200 for housing the bottom portion of the sliding cylinder 46 which is free to rotate in it and at the top of which a circumferential seat 204 is obtained for a support bearing 205 that permits the rotation of the tiller arm/hydraulic unit. Two cylindrical support portions 206 are arranged on diametrically opposite sides of the main body 200 for connecting the rocking member 32, bearing seats 208 for respective articulating pins.

The monolithic block of the cross-like support 34 is also provided with a ribbed reinforcement structure (not shown) that makes it possible to support the stresses transmitted by the rocking member and by the support bearing of the hydraulic unit.

The arrangement of the cross-like member around the monolithic block of the sliding cylinder makes it possible to obtain a hydraulic unit with "clean" surfaces as the ribbed reinforcement surfaces are not in any case exposed to the outside and are therefore protected against the accumulation of dirt during use.

The monolithic block that constitutes the wheel axle 112 is assembled below the hydraulic unit by screwing or keying instead of using the traditional steel wheel pin. The block 112 comprises a hollow central cylindrical portion 210, adapted to receive the main body 200 of the cross-like support, and two diametrically opposite cylindrical expansions 212, bearing pins 214 supporting the wheels integrally formed on which is a plurality of circumferential housings 216 for the wheel bearings. The bottom part of the block, which is ribbed, confers strength on the piece to support the forces exerted by the wheels.

Fixing Systems The fixing means used for assembling the various parts described above are conveniently of two types, respectively screw-and-nut and pin systems, in order to avoid having to make threads in the technopolymer parts as this would entail considerable complications in the moulds.

Figure 9:
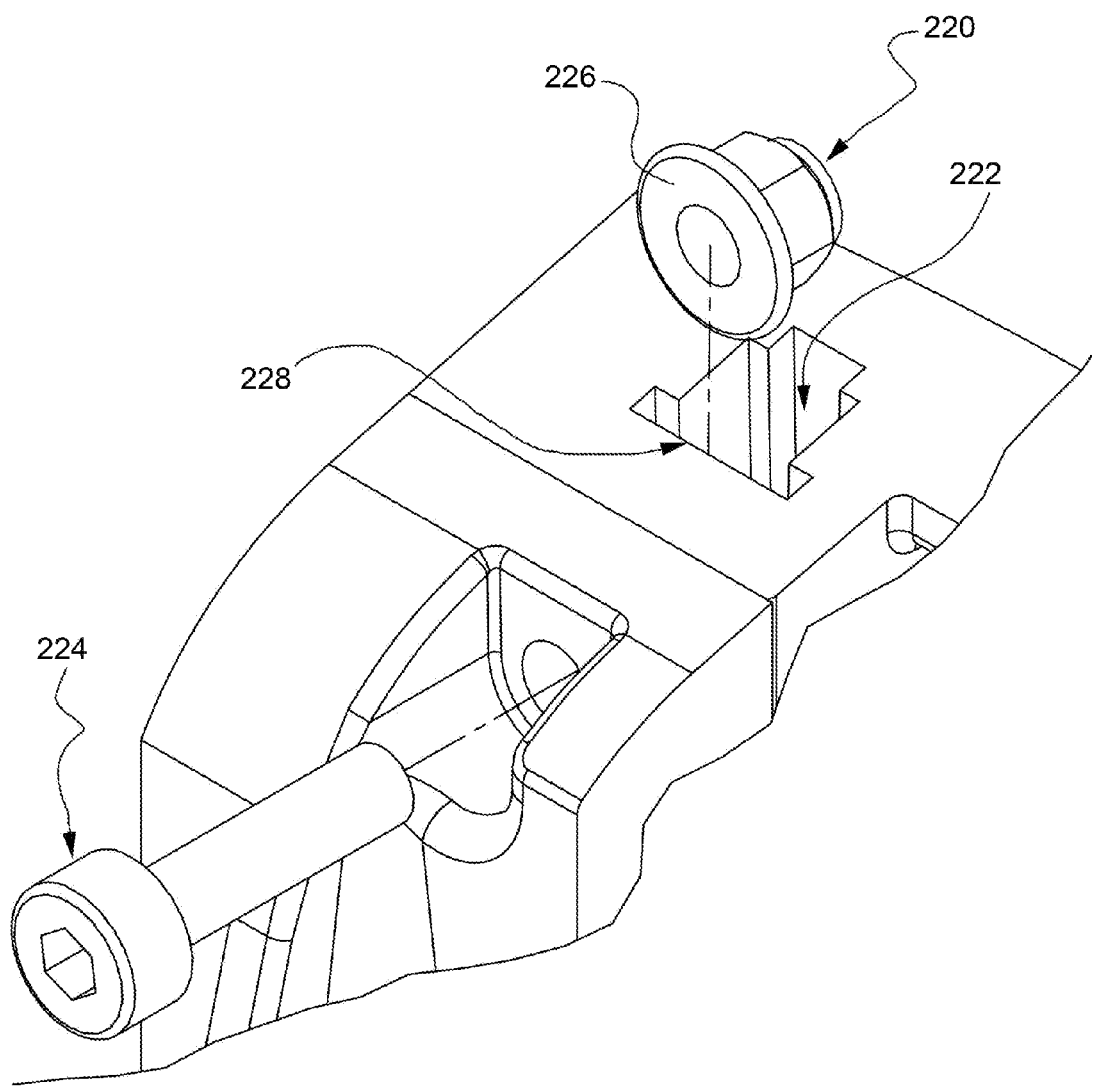
FIG. 9 is a particular view of an embodiment of the fixing means of the hydraulic unit.

In a screw-and-nut system, shown in FIG. 9, a self-locking flanged nut 220 is inserted into a seat 222 obtained when moulding the technopolymer block of one of the components of the hydraulic actuating unit, formed in such a way as to surround the nut tightly and prevent its rotation, so that fixing is obtained by acting exclusively by tightening the corresponding screw 224. The flange 226 on the nut permits better distribution of the pressure exerted in the tightened condition on a surrounding area 228 of the block of polymeric material.

The pin system, of a traditional type, is visible in FIG. 8a and, instead, is preferably used in the connection between the actuating system and the tank and between the actuating system and the sliding cylinder, and gives rise to blocking of the pumping cylinder by means of a pair of pins 230 which are arranged tangentially to it, blocking it axially by engagement in an associated slot 232.

It should be noted that the embodiment proposed for this invention in the above discussion is of a purely exemplificative nature and does not limit this invention. An expert technician in the sector can easily implement this invention in various embodiments that do not diverge, however, from the principles set out here, and are therefore included in the scope of protection of this patent defined by the attached claims.

This applies in particular as regards the possibility of making only some of the component structural parts of the truck from technopolymer, while using traditional steel machining technology for the remaining parts. In this way, of course, the extent of the advantages in terms of truck manageability and other improvements will be lower compared with the described solution in which the main identified structural components are made of technopolymer.

The invention claimed is:

1. Transpallet for handling at a ground level goods stored on a support platform, comprising a load-supporting frame having a bearing surface, provided with a pair of front arms for engaging and lifting the platform, hydraulic or pneumatic means for lifting the frame, and a tiller arm for directional manoeuvres of the transpallet and control of lifting or lowering of the frame,
    wherein said supporting frame comprises a monolithic structure made of composite polymeric material, comprising a base load-bearing structure and a pair of parallel front arms for lifting the load, supported by corresponding load rollers, the base structure having a central region, arranged for supporting the load, in a forward position compared with a pair of lateral setback shoulders to which are connected the lifting arms at curved joint sections,
    the bearing surface of the frame for supporting goods having load-resting areas which are uniform as a whole, without any opening or channel for communication between a load-housing space and the ground.

2. Transpallet according to claim 1, wherein said composite polymeric material is a technopolymer including a polypropylene or polyamide matrix charged with fibreglass.

3. Transpallet according to claim 1, wherein the monolithic block forming the supporting frame is generally hollow and has reinforcing ribs adapted to confer structural endurance, including first ribs at the back of the base load-bearing structure and arranged along concentric arcs so as to structurally connect the arms with the central region, and second ribs at the back of the arms and arranged according to a general cross arrangement repeated in adjacent cells at the side regions of the arms, so as to define along the longitudinal axis of each arm a free channel forming the seat for a corresponding strut connecting a rocking member hinged to the frame to respective articulating supports for the load rollers.

4. Transpallet according to claim 3, wherein said rocking member has a hollow monolithic structural block made of a composite polymeric material, defining a first fork-like seat for hinging to said lifting means and a pair of cantilever formations for hinging to the supporting frame and to the struts connecting to the load rollers by means of a single common transverse knuckle pin.

5. Transpallet according to claim 1, wherein the tiller arm is a monolithic structure of a composite polymeric material defining a tubular frame, whose top portion forms a handle for driving the transpallet, and an axial column, at the end of which is arranged a lever for actuating the transpallet.

6. Transpallet for handling at a ground level goods stored on a support platform, comprising a load-supporting frame having a bearing surface, provided with a pair of front arms for engaging and lifting the platform, hydraulic or pneumatic means for lifting the frame, and a tiller arm for directional manoeuvres of the transpallet and control of lifting or lowering of the frame,
    wherein said supporting frame comprises a monolithic structure made of composite polymeric material,
    wherein the tiller arm is a monolithic structure of a composite polymeric material defining a tubular frame, whose top portion forms a handle for driving the transpallet, and an axial column, at the end of which is arranged a lever for actuating the transpallet,
    wherein said column houses therein a textile fibre flexible member for connection between the actuating lever and a control member for the lifting means.

7. Transpallet for handling at a ground level goods stored on a support platform, comprising a load-supporting frame having a bearing surface, provided with a pair of front arms for engaging and lifting the platform, hydraulic or pneumatic means for lifting the frame, and a tiller arm for directional manoeuvres of the transpallet and control of lifting or lowering of the frame,
    wherein said supporting frame comprises a monolithic structure made of composite polymeric material,
    wherein the lifting means comprise a hydraulic unit for actuating a lifting rod adapted to engage an abutment formation of the frame and cause its lifting/lowering, wherein said unit comprises an assembly of separate monolithic blocks that define a tank for an actuating fluid, a pumping actuating system for that fluid, and a cylinder for sliding of the frame lifting rod, respectively, the monolithic blocks being adapted to be sealingly assembled one to another and the monolithic blocks each comprising composite polymeric material.

8. Transpallet according to claim 7, wherein the monolithic block of the tank and the monolithic block of the pumping system have corresponding matching shaped vertical walls each comprising a raising formation on which a groove is made, which is adapted to form a channel for housing a pin for rotation of the tiller arm.

9. Transpallet according to claim 7, wherein the monolithic block of the cylinder for sliding of the lifting rod has an outer lateral surface having ribs along an axial and a circumferential direction.

10. Transpallet according to claim 7, wherein the hydraulic unit comprises a safety valve housed in the monolithic block of the tank, arranged upstream of a relief valve of the pumping actuation system and adapted to put in communication the cylinder with the tank when the pressure of the actuating fluid exceeds a predetermined limit value, opposing the resilient force applied by an adjustable preloading spring.

11. Transpallet according to claim 7, wherein the monolithic block of the pumping actuating system defines a seat for a valve assembly comprising a relief valve and a control valve for hydraulic actuation, the control valve being prevented from rotating by engaging a corresponding hexagonal head in a respective seat obtained in said block, the relief valve being screwed on the end of the control valve.

12. Transpallet according to claim 7, wherein the monolithic block of the pumping actuating system defines a seat for a pumping cylinder adapted to slidably receive an actuating piston controllable through the tiller arm, and comprising a return spring within the cavity where the piston slides, acting upon said piston.

13. Transpallet according to claim 7, wherein said lifting means comprise a cross-like support for connection to a rocking member hinged to the frame and to a pair of struts for connection to the load rollers supporting the lifting arms, said cross-like support being formed as a monolithic block of composite polymeric material, which has a main body defining a tubular cavity for housing the cylinder for sliding of the frame lifting rod, within which said cylinder is free to rotate.

14. Transpallet according to claim 7, including a plurality of metallic retaining means comprising screw-and-nut connecting systems and pin connecting systems, arranged for firmly coupling the monolithic block composing the hydraulic unit.

* * * * *